United States Patent
Huang et al.

(10) Patent No.: US 10,381,900 B2
(45) Date of Patent: Aug. 13, 2019

(54) METHOD AND ASSEMBLY OF AN ELECTRIC MACHINE

(71) Applicant: GE AVIATION SYSTEMS, LLC, Grand Rapids, MI (US)

(72) Inventors: Hao Huang, Troy, OH (US); Xiaochuan Jia, Centerville, OH (US)

(73) Assignee: GE AVIATION SYSTEMS LLC, Grand Rapids, MI (US)

( * ) Notice: Subject to any disclaimer, the term of this patent is extended or adjusted under 35 U.S.C. 154(b) by 169 days.

(21) Appl. No.: 15/468,879

(22) Filed: Mar. 24, 2017

(65) Prior Publication Data
US 2018/0278127 A1    Sep. 27, 2018

(51) Int. Cl.
| H02K 9/19 | (2006.01) |
|---|---|
| H02K 9/197 | (2006.01) |
| H02K 7/20 | (2006.01) |
| H02K 1/32 | (2006.01) |
| H02K 3/24 | (2006.01) |
| H02K 7/18 | (2006.01) |

(52) U.S. Cl.
CPC .............. H02K 9/197 (2013.01); H02K 1/32 (2013.01); H02K 3/24 (2013.01); H02K 7/1823 (2013.01); H02K 7/20 (2013.01); *H02K 2213/03* (2013.01)

(58) Field of Classification Search
CPC .......... H02K 7/00; H02K 7/18; H02K 7/1807; H02K 7/20; H02K 5/00; H02K 5/12; H02K 5/128; H02K 5/20; H02K 9/00; H02K 9/02; H02K 9/19; H02K 9/197; H02K 9/20; H02K 9/22; H02K 9/38; H02K 11/00; H02K 11/04; H02K 11/042; H02K 15/02; H02K 15/14; H02K 19/00; H02K 19/16; H02K 19/38
See application file for complete search history.

(56) References Cited

U.S. PATENT DOCUMENTS

| 3,571,634 | A | * | 3/1971 | Sato ....................... | H02K 9/193 310/54 |
|---|---|---|---|---|---|
| 4,797,590 | A | * | 1/1989 | Raad ...................... | H02K 19/38 310/112 |
| 5,319,272 | A | * | 6/1994 | Raad .................... | H02K 11/042 310/54 |
| 5,523,635 | A | * | 6/1996 | Ferreira .................. | F02N 11/04 310/54 |
| 6,903,470 | B2 | | 6/2005 | Doherty et al. | |
| 7,663,283 | B2 | | 2/2010 | Holtzapple et al. | |
| 7,675,209 | B2 | | 3/2010 | Masoudipour et al. | |
| 7,687,928 | B2 | * | 3/2010 | Taneja .................... | F01D 15/10 290/31 |

(Continued)

FOREIGN PATENT DOCUMENTS

JP    2015033226 A  *  2/2015   ............... H02K 9/19

*Primary Examiner* — Tran N Nguyen
(74) *Attorney, Agent, or Firm* — McGarry Bair PC

(57) ABSTRACT

An electric machine assembly having a main machine stator core having at least one stator post, a set of stator windings wound about the at least one stator post and having a first end and an opposing second end, a coolant inlet housing defining an inlet passage, a coolant outlet housing defining an outlet passage, proximate to the coolant inlet housing, and wherein the coolant inlet passage and the coolant outlet passage define a coolant circuit configured to receive a supply of coolant to remove heat generated in the set of stator windings.

20 Claims, 7 Drawing Sheets

(56) References Cited

U.S. PATENT DOCUMENTS

| | | |
|---|---|---|
| 7,821,145 B2 | 10/2010 | Huang et al. |
| 8,030,788 B2 | 10/2011 | Xu et al. |
| 8,232,702 B2 | 7/2012 | Zywot et al. |
| 8,450,888 B2 | 5/2013 | Shafer et al. |
| 8,720,205 B2 | 5/2014 | Lugg |
| 2004/0145246 A1* | 7/2004 | Nakano .................. H02K 1/18 310/11 |
| 2008/0185924 A1* | 8/2008 | Masoudipour .......... H02K 5/20 310/54 |
| 2010/0264759 A1* | 10/2010 | Shafer .................... H02K 1/20 310/54 |
| 2013/0207395 A1* | 8/2013 | Huang .................... H02K 9/19 290/46 |
| 2016/0149451 A1 | 5/2016 | Teter et al. |

\* cited by examiner

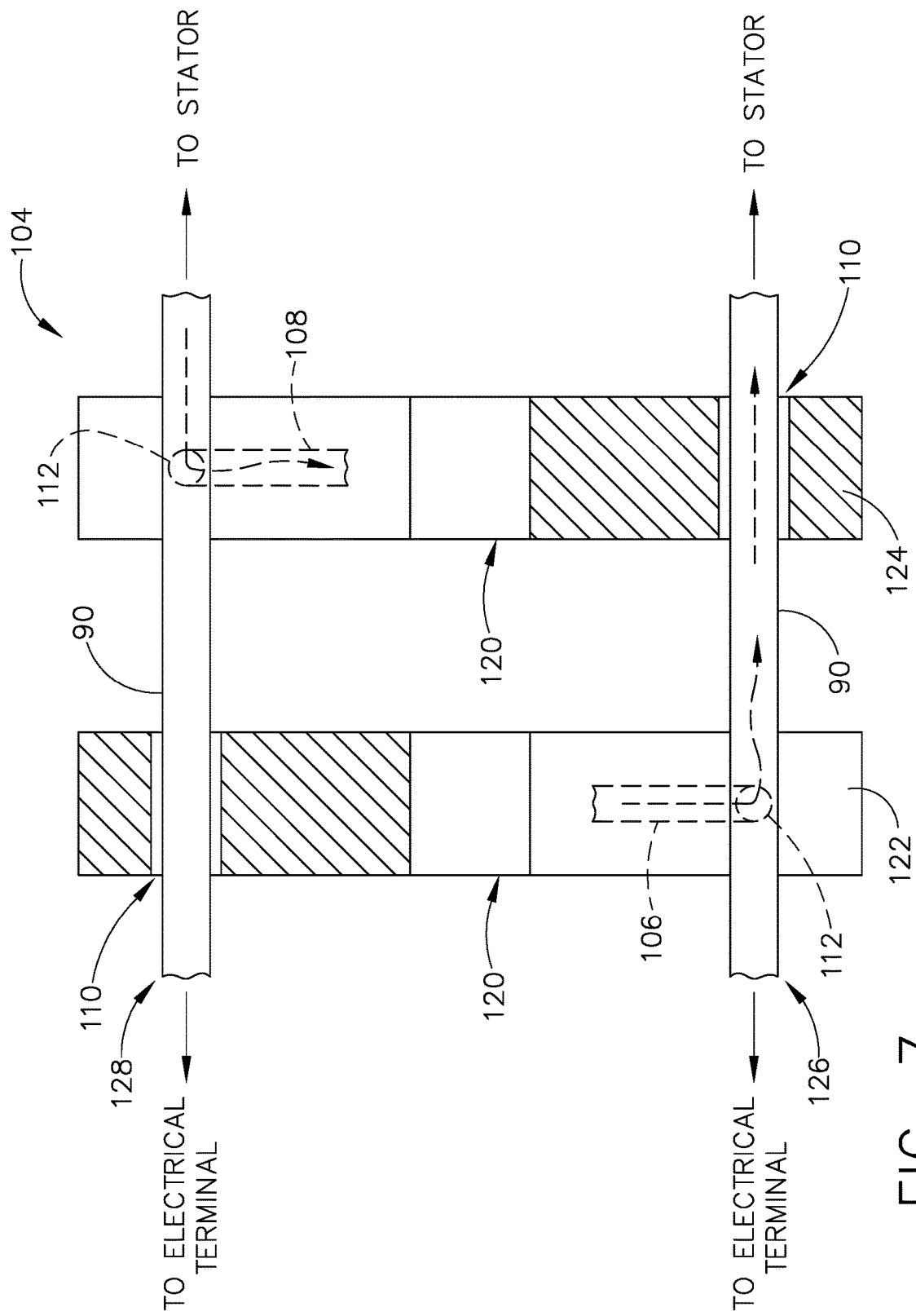

METHOD AND ASSEMBLY OF AN ELECTRIC MACHINE

BACKGROUND OF THE INVENTION

Contemporary aircraft engines include electric machine assemblies, or generator systems, which utilize a running aircraft engine in a generator mode to provide electrical energy to power systems and components on the aircraft. Some aircraft engines can further include starter/generator (S/G) systems or motor/generator (M/G), which act as a motor to start an aircraft engine from its high pressure spool or a motor to drive the engine from its low pressure spool, and as a generator to provide electrical energy to power systems on the aircraft after the engine is running. Motors and generators can be wet cavity systems, wherein a cavity housing the rotor and stator is exposed to liquid coolant, or dry cavity systems, wherein the cavity is not exposed to liquid coolant. Dry cavity cooling can also utilize liquid coolant in one or more contained cooling systems, but they are still considered dry cavity so long as the cavity is not exposed to liquid coolant. In general, dry cavity systems generally have less losses, higher efficiency, higher reliability, less required maintenance, and attitude independence over wet cavity systems. In contrast, the power density of a wet cavity electric machine can be higher than that of a dry cavity electric machine due to its higher cooling effectiveness. However, this may not be true once more than one contained cooling systems applied in a dry cavity machine.

BRIEF DESCRIPTION OF THE INVENTION

In one aspect, the disclosure relates to an electric machine assembly including a main machine stator core having at least one stator post, a set of stator windings wound about the at least one stator post and having a first end and an opposing second end, the stator windings defining a fluid channel disposed through the stator windings configured to carry a flow of coolant, a coolant inlet housing defining an inlet passage disposed at an axial end of the electric machine assembly fluidly connected with the fluid channel of the first end of the set of stator windings, and a coolant outlet housing defining an outlet passage disposed at the axial end of the electric machine assembly, proximate to the coolant inlet housing, and fluidly connected with the fluid channel of the second end of the stator windings. The coolant inlet passage, the fluid channel of the stator windings, and the coolant outlet passage define a coolant circuit configured to receive a supply of coolant to remove heat generated in the set of stator windings.

BRIEF DESCRIPTION OF THE DRAWINGS

In the drawings:

FIG. 7 is a schematic view of the stator windings of the generator of FIG. 3 and a cooling system, in accordance with various aspects described herein.

DESCRIPTION OF EMBODIMENTS OF THE INVENTION

Figure 1:
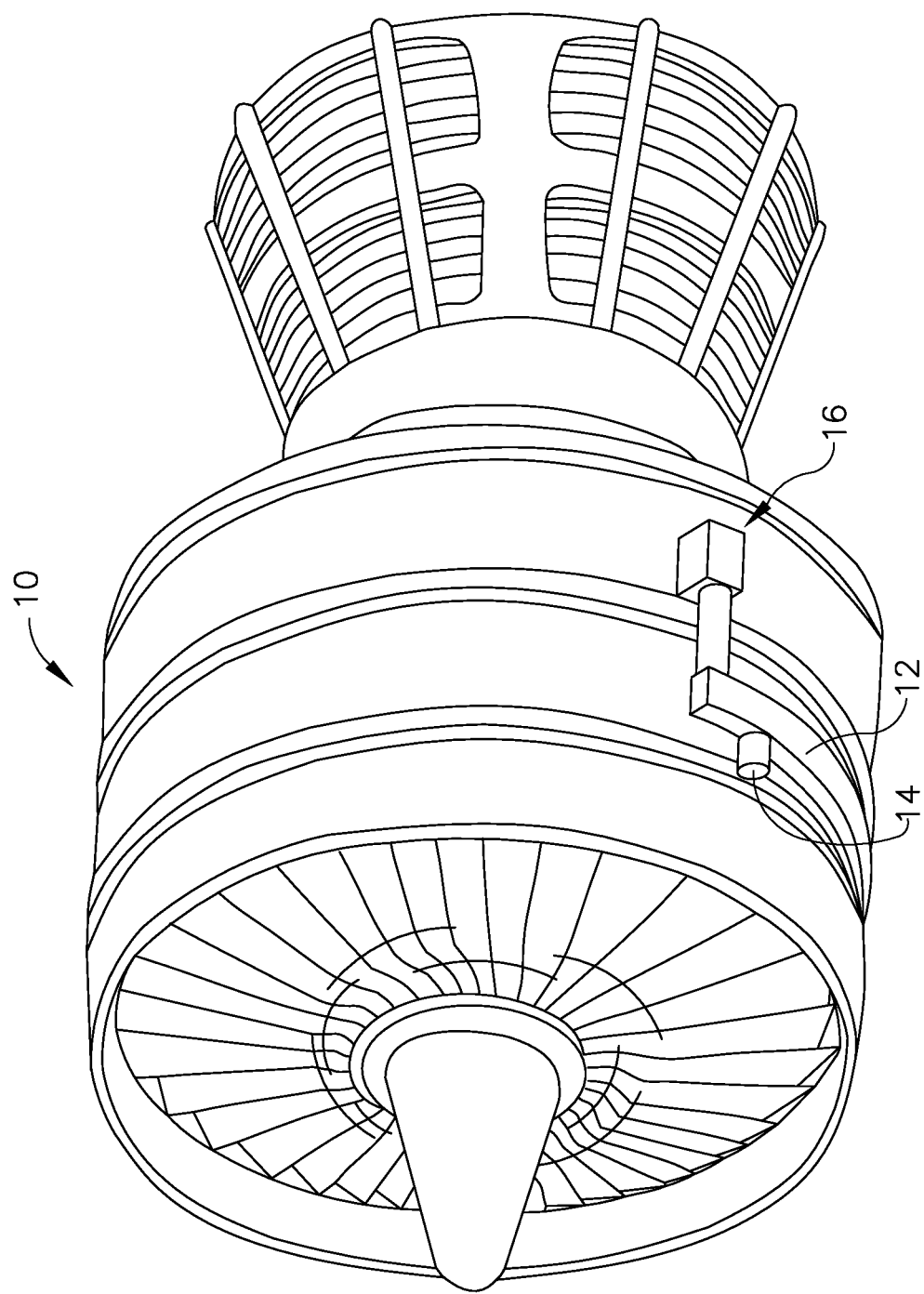
FIG. 1 is a perspective view of a gas turbine engine having a generator in accordance with various aspects described herein.

Aspects of the disclosure can be implemented in any environment using an electric generator or motor regardless of whether the electric generator or motor provides a driving force or generates electricity. For purposes of this description, such an electric motor will be generally referred to as an electric machine, electric machine assembly, generator, or similar language, which is meant to clarify that one or more stator/rotor combinations can be included in the machine.

While "a set of" various elements will be described, it will be understood that "a set" can include any number of the respective elements, including only one element. As used herein, the terms "axial" or "axially" refer to a dimension along a longitudinal axis of an electric machine or along a longitudinal axis of a component disposed within the electric machine. As used herein, the terms "radial" or "radially" refer to a dimension extending between a center longitudinal axis of the electric machine, an outer rotational circumference, or a circular or annular component disposed within the electric machine. The use of the terms "proximal" or "proximally," either by themselves or in conjunction with the terms "radial" or "radially," refers to moving in a direction toward the center longitudinal axis, or a component being relatively closer to the center longitudinal axis as compared to another component.

All directional references (e.g., radial, axial, upper, lower, upward, downward, left, right, lateral, front, back, top, bottom, above, below, vertical, horizontal, clockwise, counterclockwise) are only used for identification purposes to aid the reader's understanding of the disclosure, and do not create limitations, particularly as to the position, orientation, or use thereof. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to each other. The exemplary drawings are for purposes of illustration only and the dimensions, positions, order and relative sizes reflected in the drawings attached hereto can vary.

While this description is primarily directed toward an electric machine providing power generation, it is also applicable to an electric machine providing a driving force or an electric machine providing both a driving force and power generation. Further, while this description is primarily directed toward an aircraft environment, aspects of the disclosure are applicable in any environment using an electric machine. Thus, a brief summary of a contemplated environment should aid in a more complete understanding.

FIG. 1 illustrates a gas turbine engine 10 having an accessory gear box (AGB) 12 and a generator 14 according to an aspect of the disclosure. The gas turbine engine 10 can be a turbofan engine, such as a General Electric GEnx or CF6 series engine, commonly used in modern commercial and military aviation or it could be a variety of other known gas turbine engines such as a turboprop or turboshaft. The gas turbine engine 10 can also have an afterburner that burns an additional amount of fuel downstream of the low pressure turbine region to increase the velocity of the exhausted gases, and thereby to increase thrust. The AGB 12 can be coupled to a turbine shaft (not shown) of the gas turbine engine 10 by way of a mechanical power take off 16. The gas turbine engine 10 can be any suitable gas turbine engine used in modern commercial and military aviation or it could be a variety of other known gas turbine engines such as a turboprop or turboshaft. The type and specifics of the gas turbine engine 10 are not germane to the disclosure and will not be described further herein. While a generator 14 is shown and described, aspects of the disclosure can include any electrical machine, generator, motor, starter/generator, of combination there, and are not limited to generator aspects that can provide electrical power. For instance, in one non-limiting example, a generator can operate in a power generation mode to provide power, or in a motor mode, wherein power is consumed to generate rotational force, such as propulsion. Non-limiting examples of the generator 14 can include synchronous machine architectures.

Figure 2:
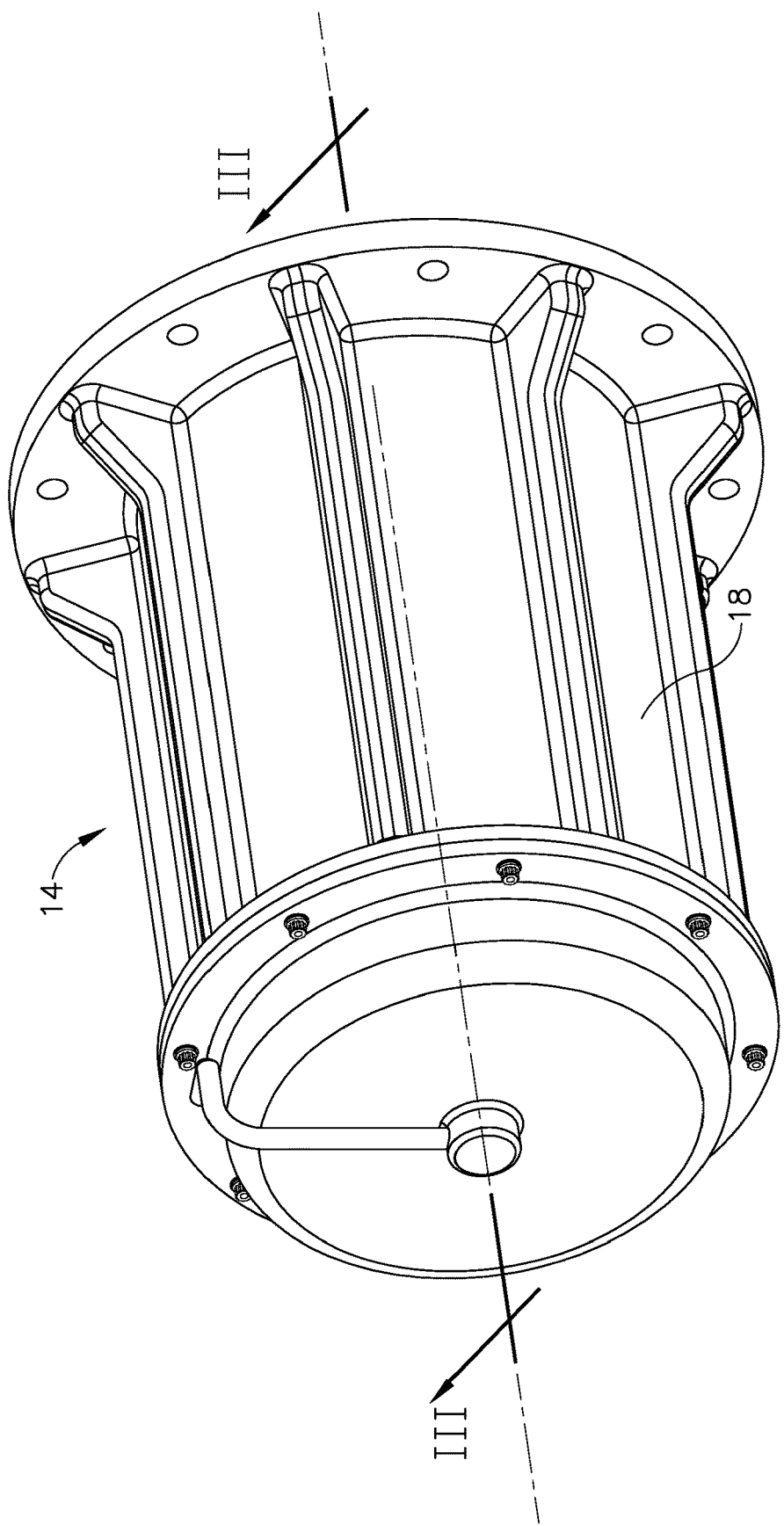
FIG. 2 is a perspective view of an exterior of the generator of FIG. 1, in accordance with various aspects described herein.

FIG. 2 more clearly illustrates the generator 14 and its housing 18. Multiple electrical connections can be provided on the exterior of the generator 14 to provide for the transfer of electrical power to and from the generator 14. The electrical connections can be further connected by cables to an electrical power distribution node of an aircraft having the gas turbine engine 10 to power various items on the aircraft, such as lights and seat-back monitors.

Non-limiting aspects of the disclosure can be included wherein, for instance, a clamping interface can be included and used to clamp the generator 14 to the AGB 12. In another non-limiting aspect of the disclosure, the generator 14 can include a liquid coolant system for cooling or dissipating heat generated by components of the generator 14 or by components proximate to the generator 14, such as the gas turbine engine 10. For example, the generator 14 can include a liquid cooling system using oil as a coolant. The liquid cooling system can include a cooling fluid inlet port and a cooling fluid outlet port (not shown) for controlling the supply of coolant to the generator 14. In yet another non-limiting aspect of the disclosure, the generator 14 can further include other liquid cooling system components, such as a liquid coolant reservoir fluidly coupled with the cooling fluid inlet port or cooling fluid outlet port, or a liquid coolant pump to forcibly supply the coolant through the ports or generator 14. Oil is merely one non-limiting example of a liquid coolant that can be used in aspects of the disclosure. Additional or alternative types of fluid coolant can be included in aspects of the disclosure, including but not limited to, liquids, gases, fluids, or a combination thereof.

Figure 3:
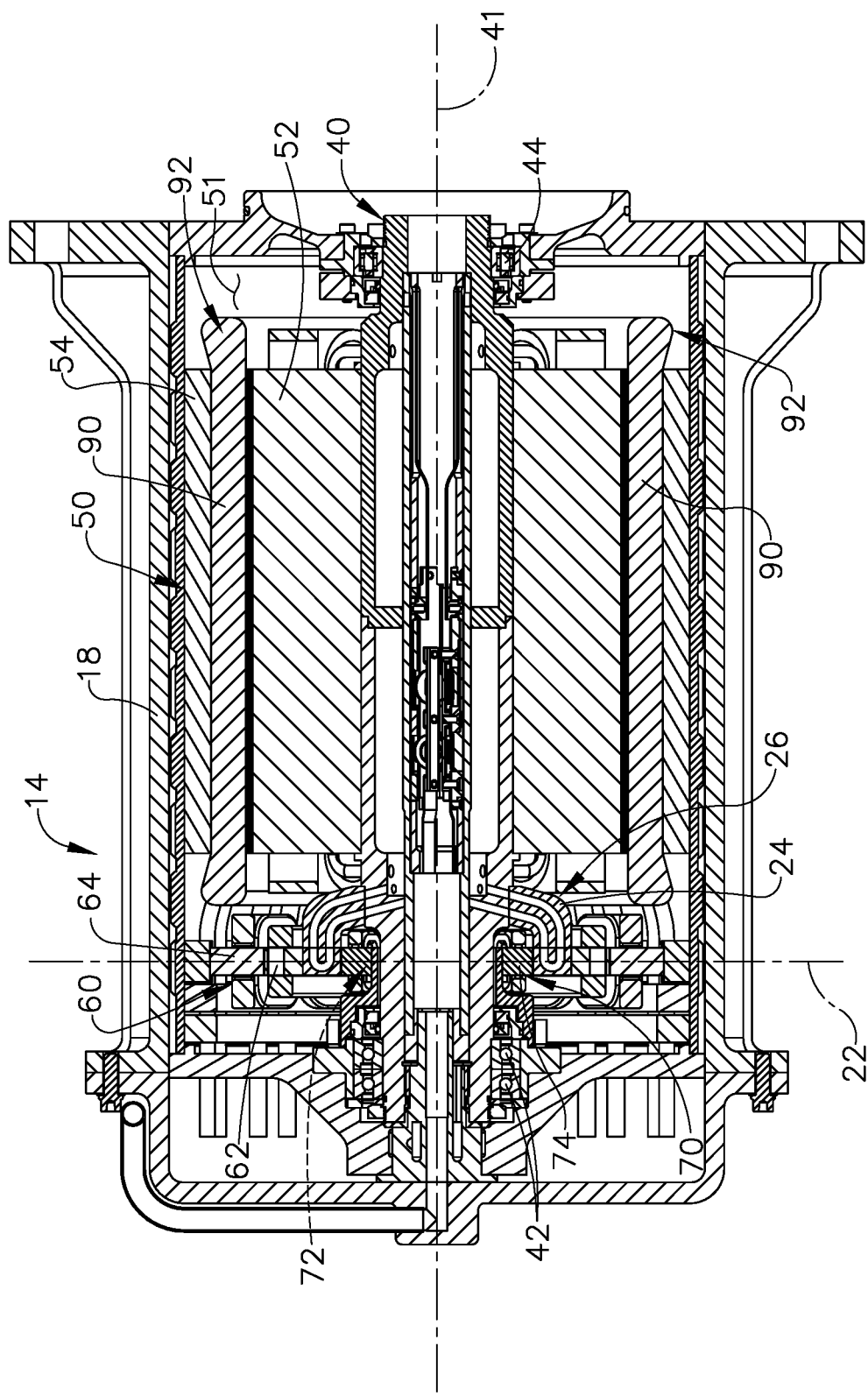
FIG. 3 is a schematic cross-sectional view of the generator, taken along line of FIG. 2 and illustrating the structure of the generator, in accordance with various aspects described herein.

The interior of the generator 14 is best seen in FIG. 3, which is a first sectional view of the generator 14 shown in FIG. 2. A rotatable shaft 40 is located within the generator 14 and is the primary structure for supporting a variety of components. The rotatable shaft 40 can have a single diameter or one that can vary along its length. The rotatable shaft 40 is supported by spaced bearings 42 and 44 and configured to rotate about axis of rotation 41. Several of the elements of the generator 14 have a fixed component and a rotating component, with the rotating component being provided on the rotatable shaft 40. Examples of these elements can include a main machine 50, housed within a main machine cavity 51, an exciter 60, and a permanent magnet generator (PMG) 70. The corresponding rotating component comprises a main machine rotor 52, an exciter rotor 62, and a PMG rotor 72, respectively, and the corresponding fixed component comprises a main machine stator 54 or stator core, an exciter stator 64, and a PMG stator 74.

As shown, aspects of the exciter 60, and the PMG 70 can be coplanar to a plane 22 orthogonal or perpendicular to the axis of rotation 41. In this sense, non-limiting aspects of the exciter 60, such as the exciter rotor 62 or exciter stator 64, or aspects of the PMG 70, such as the PMG rotor 72 or the PMG stator 74 can be coplanar at the orthogonal plane 22. Also as shown, the exciter 60, the exciter rotor 62, or the exciter stator 64 can be disposed along an outer radius of the PMG 70, the PMG rotor 72, or the PMG stator 74. Thus, the exciter 60 can be located radially outward from the PMG 70, relative to the axis of rotation 41.

While the illustrated aspects of the disclosure are shown wherein the exciter 60 and the PMG 70 components are co-located at the orthogonal plane 22, aspects of the disclosure can be included wherein the exciter 60 and the PMG 70 components are substantially coplanar with each other, or with a single orthogonal plane 22. Additional aspects of the disclosure can be included wherein aspects of the exciter 60 and the PMG 70 components are configured, arranged, disposed, or the like in a coplanar relationship wherein at least a portion of the exciter 60 or the PMG 70 axially overlaps the other component along the axis of rotation 41. Thus, "substantially coplanar" is not limited to a precise planar representation, and can include any overlapping between respective components 60, 70 along an axial segment.

The generator 14 can also include an arm 24 disposed on the rotatable shaft 40 and configured to co-rotate with the shaft 40. The arm 24 can also provide a mounting for at least one of the PMG rotor 72 or the exciter rotor 62. Non-limiting aspects of the disclosure can be included wherein another of the PMG rotor 72 or the exciter rotor 62 can be rotationally mounted directly to the rotatable shaft 40. In another non-limiting aspect of the disclosure both the PMG rotor 72 and the exciter rotor 62 can be rotationally mounted to the arm 24. The arm 24 can include a segment 26 extending radially away from the rotatable shaft 40 such that the arm 24 or the segment 26 has a larger radius, as measured from the axis of rotation 41, compared with the rotatable shaft 40. Non-limiting aspects of the disclosure can be included wherein the arm 24 or segment 26 can include a set of arms 24 or segments 26 that are radially spaced about the rotatable shaft 40. The set of arms 24 or segments 26 can be radially spaced based on a desired rotational balance between the exciter rotor 62, the PMG rotor 72, permanent magnets, a number of poles of the exciter rotor 62 or PMG rotor 72, the set of arms 24, the set of segments 26, or a combination thereof.

In another non-limiting aspect of the disclosure, the arm 24 or segment 26 can include a continuous arm 24 or segment 26, where the arm 24 or segment 26 extends continuously (e.g. without radial breaks or radial gaps) about the axis of rotation 41. In this non-limiting aspect of the disclosure, the exciter rotor poles, the PMG rotor poles, or permanent magnets can be disposed, arranged, radially spaced, or the like based on a desired rotational balance between the exciter rotor 62, the PMG rotor 72, permanent magnets, a number of poles of the exciter rotor 62 or PMG rotor 72, the arm 24, the segment 26, or a combination thereof.

While the illustrated example shows aspects of the exciter rotor 62, the exciter stator 64, the PMG rotor 72, and the PMG stator 74 are represented in the same cross-sectional view for ease of understanding, aspects of the disclosure can be included wherein the exciter rotor 62, the exciter stator 64, the PMG rotor 72, or the PMG stator 74 are radially offset from other components. For instance, in one non-limiting aspect, the PMG rotor 72 can be radially offset from the exciter rotor 62 to reduce, prevent, or eliminate magnetic interference between the respective components. In another non-limiting aspect of the disclosure, aspects of the exciter 60 or PMG 70 can be electromagnetically shielded from corresponding components, such as radially separating the exciter 60 from the PMG 70, to reduce, prevent, or eliminate magnetic interference between the respective components.

In this manner, the main machine rotor 52, exciter rotor 62, and PMG rotor 72 are disposed on, or rotationally supported by the rotatable shaft 40, such as directly by the shaft 40, or indirectly by the shaft 40, as in the aforementioned arm 24. The fixed components, such as the main machine stator 54, the exciter stator 64, or the PMG stator 74 can be mounted to any suitable part of the housing 18, such that relative rotation of the rotor components can electromechanically interact with the respective stator components 54, 64, 74. The main machine stator 54, exciter stator 64, and PMG stator 74 define an interior through which the rotatable shaft 40 extends.

It will be understood that the main machine rotor 52, exciter rotor 62, and PMG rotor 72 can have a set of rotor poles, including, but not limited to two rotor poles, and that the main machine stator 54, exciter stator 64, and PMG stator 74 can have a set of stator teeth or stator poles, including, but not limited to two stator teeth or stator poles. The set of rotor poles can generate a set of magnetic fields relative to the set of stator poles, such that the generator 14 can operate through the interaction of the magnetic fields and current-carrying conductors to generate force or electrical power. The exciter 60 can provide direct current to the main machine 50 and the main machine 50 and PMG 70 can supply AC electrical power when the rotatable shaft 40 rotates.

At least one of the rotor poles and stator teeth or stator poles can be formed by a core with a post and wire wound about the post to form a winding, with the winding having at least one end turn. Aspects of the disclosure shown include at least one set of stator windings 90 arranged longitudinally along the stator housing 18, that is, in parallel with housing 18 and the rotor axis of rotation 41. The set of stator windings 90 can also include a set of stator winding end turns 92 extending axially beyond opposing ends of a longitudinal length of a main machine stator 54.

The components of the generator 14 can be any combination of known generators. For example, the main machine 50 can be either a synchronous or asynchronous generator. In addition to the accessories shown in this aspect, there can be other components that need to be operated for particular applications. For example, in addition to the electromechanical accessories shown, there can be other accessories driven from the same rotatable shaft 40 such as the liquid coolant pump, a fluid compressor, or a hydraulic pump.

Figure 4:
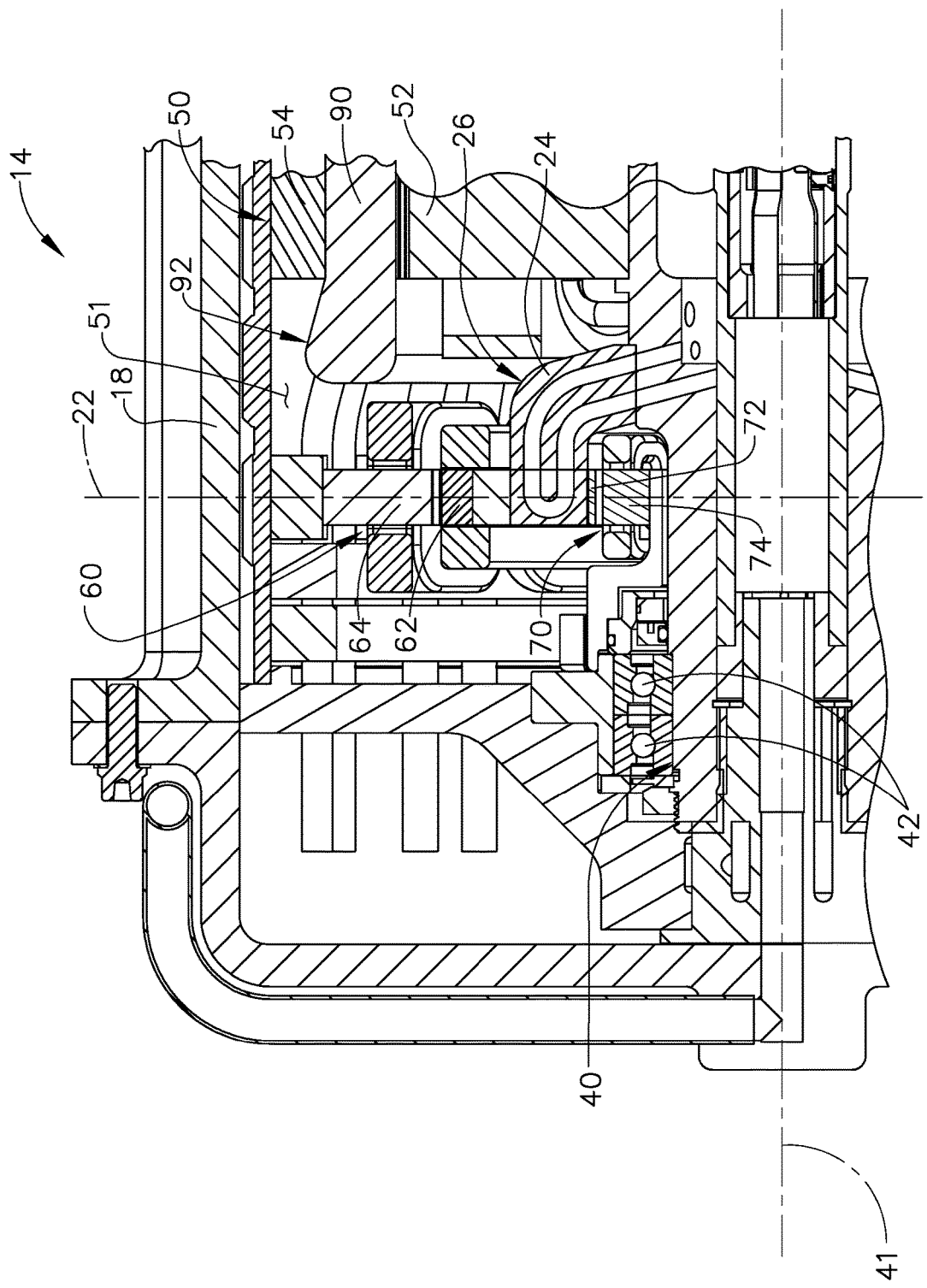
FIG. 4 is a schematic zoomed view of the generator of FIG. 3, in accordance with various aspects described herein.

FIG. 4 illustrates a zoomed view of the generator 14 for better understanding of the operation and effect of the substantially coplanar exciter 60 and PMG 70, for ease of understanding.

By arranging, disposing, locating, or the like, aspects of the exciter 60 and PMG 70 about a substantially coplanar relationship, such as about plane 22 or section along the axial direction of the rotational axis 41, the overall length of the rotatable shaft 40 can be reduced, compared with a generator, electrical machine, or the like wherein the exciter 60 and PMG 70 are arranged in series or sequentially along the axial direction of the rotational axis. By reducing the overall length of the rotatable shaft 40, the structure of the generator 14 can be reduced, as measured in volume, length, size, compactness, displacement, or the like. In this sense, reducing the size of the generator 14 increases the power density of the generator 14, compared with similarly situated electrical machine where the exciter 60 and PMG 70 are arranged in series or sequentially along the axial direction of the rotational axis.

Figure 5:
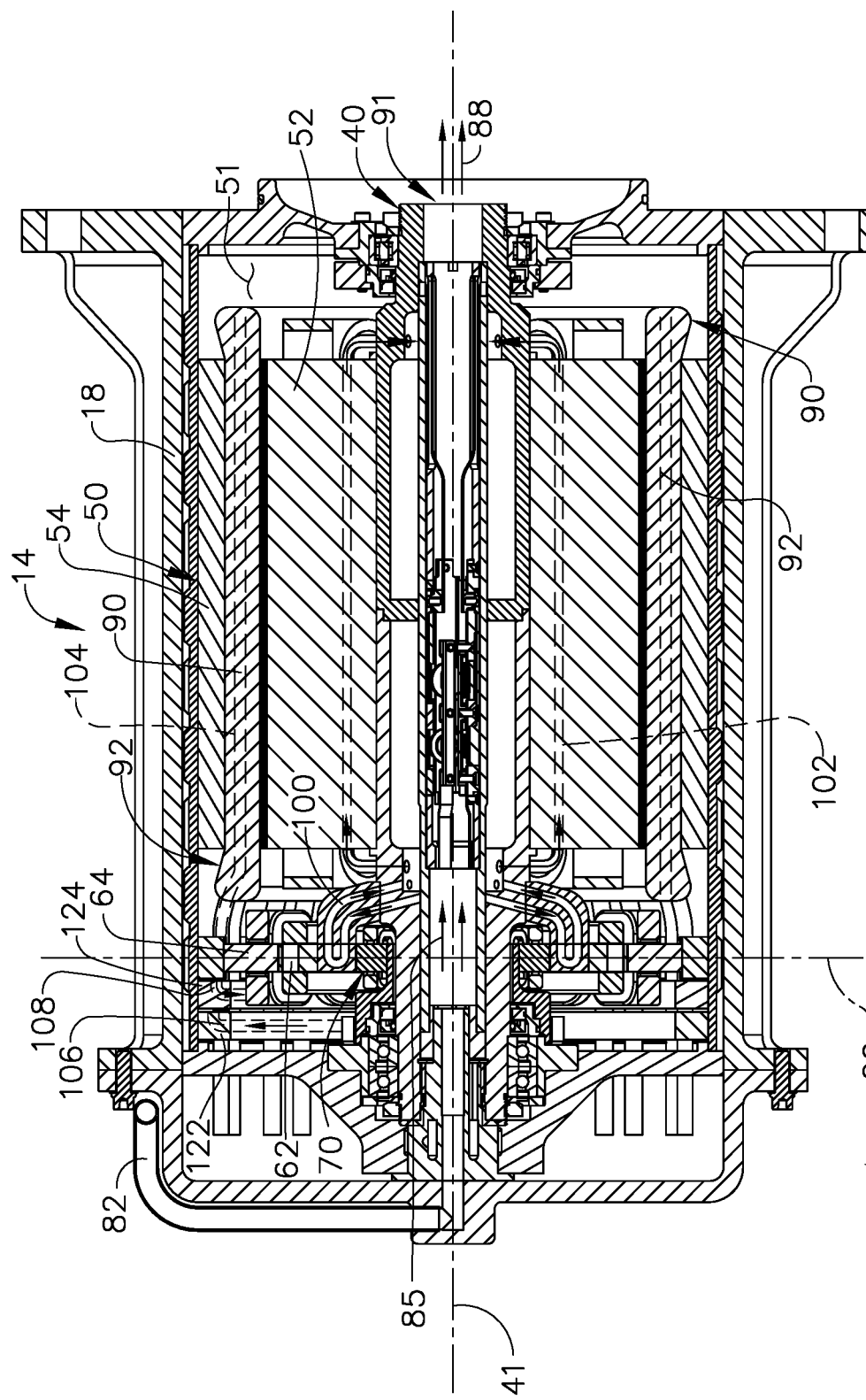
FIG. 5 is a schematic cross-sectional view of the generator, illustrating the cooling system of the generator, in accordance with various aspects described herein.

As explained above, the generator 14 can be oil cooled and thus can include a cooling system. The cooling oil can be used to dissipate heat generated by the electrical and mechanical functions of the generator 14. FIG. 5 illustrates a non-limiting example cooling system 80. FIG. 5 illustrates a second sectional view, different from the sectional view of FIG. 3, to better illustrate aspects of the cooling system 80. In one example, aspects of the cooling system 80 can utilize oil based on, for instance, a desired cooling capability, a high specific heat, a high thermal capacity, or a desired viscosity (e.g. for pumping purposes). In another example, cooling oil can also provide for lubrication of the generator 14. In the illustrated aspects of the disclosure, the generator 14 can be a liquid cooled, dry cavity system having the cooling system 80 illustrated as including the cooling fluid inlet port 82 and the shaft outlet port 91 for controlling the supply of the cooling fluid to the cooling system 80.

The cooling system 80 can further include, for example, a cooling fluid reservoir and various cooling passages. The rotatable shaft 40 can provide one or more flow channels or paths for the main machine rotor 52, exciter rotor 62, and PMG rotor 72. In one non-limiting example aspect of the cooling system 80, the rotatable shaft 40 can define an interior 84 to receive a flow of cooling oil (shown as arrows 85), which can be further pumped, transported, delivered, or diverted to additional cooling passages. In another non-limiting aspect of the cooling system 80, the arm 24 or segment 26 can include a first cooling passage 100 disposed or arranged to carry a flow of cooling oil through the arm 24 or segment 26. The first cooling passage 100 can be operably configured to thermally receive heat generated in rotationally-supported components, including, but not limited to, the exciter rotor 62 the PMG rotor 72, or a combination thereof, and transfer the heat to the cooling oil for removal. In yet another non-limiting aspect of the cooling system 80, the main machine rotor 52 can include a second cooling passage 102 disposed or arranged to carry a flow of cooling oil through the main machine rotor 52. The second cooling passage 102 can be operably configured to thermally receive heat generated in the main machine rotor 52 and transfer the heat to the cooling oil for removal. Heated oil, Residual, unused, or unspent oil can be discharged from the rotatable shaft 40 can be provided to an outlet port, such as the rotor shaft oil outlet 88 or the shaft outlet port 91.

Non-limiting aspects of the disclosure can be included wherein the first or second cooling passages 100, 102 can be radially spaced about the rotatable shaft 40. The first or second cooling passages 100, 102 can be radially spaced based on a desired rotational balance, or a set of desired heat removal characteristics. For instance, in one non-limiting aspect, the first or second cooling passages 100, 102 can be disposed proximate to respective main machine 50, exciter 60, or PMG 70 heat-generating components to ensure reliable thermal coupling.

As shown, non-limiting aspects of the cooling system 80 can further include a cooling circuit for the set of stator windings 90 of the main machine stator 54. For instance, at least one set of stator windings 90 can be wound about the main machine stator 54, wherein A problem with conventional wet or dry cavity generators is that conventional cooling system have difficultly removing heat generated by at least one of the main machine stator or the set of stator windings disposed or located closer to the axial center of the stator. Heat retained proximate to the axial center of the main machine stator or the set of stator windings can result in reduced generator performance or output. Unwanted heat can be caused by, for example, stator core losses due to hysteresis or eddy currents generated during generator operations. In on non-limiting example, conventional generators can address this problem by including a low thermal conductive layer (e.g. approximately 0.12 Watts per degree Celsius-meter; "W/mC") between the stator and stator windings to thermally conduct a small portion of heat away from the stator to the windings, while an external cooling jacket thermally conducts the majority of heat away from the stator. A conventional external cooling jacket includes coolant passages encircling at least a portion of the main machine stator, wherein the jacket coolant passages are fluidly coupled with a liquid coolant source. The liquid coolant traversing the cooling jacket provides cooling to ensure desired generator operation, but the addition of cooling systems increases the costs, complexity, and adds to the weight and size requirements of the generator system.

Aspects of the disclosure provide an alternative solution to address cooling problem of at least the main machine stator 54, the set of stator windings 90, or a combination thereof, by using a specialized configuration of main machine stator windings 90 including a third cooling passage 104 disposed through the windings 90, and configured to carry a flow of cooling oil through at least a subset of the stator windings 90. The third cooling passage 104 can be operably configured to thermally receive heat generated in the main machine stator 54 or the set of stator windings 90 and transfer the heat to the cooling oil for removal. In one non-limiting aspect, a first end of the set of stator windings or the third cooling passage 104 can be fluidly connected with the oil flow by, for example, a stator windings coolant inlet housing 122 defining an inlet passage 106, connected with the at least subset of stator windings 90 axially past the stator winding end turns 92. Heated oil, Residual, unused, or unspent oil can be discharged from the at least subset of stator windings 90 by way of a stator windings coolant outlet housing 124 defining an outlet passage 108, which, for example, can also be located axially past the stator winding end turns 92. The stator windings outlet passage 108 can be further connected with an oil outlet port for the generator 14, such as the rotor shaft oil outlet 88 or the shaft outlet port 91. Aspects of the disclosure can be included wherein the coolant inlet housing 122 and the coolant outlet housing 124 are axially spaced from one another. At least one of the coolant inlet housing 122 or the coolant outlet housing 124 can be of the form of a pancake or ring configuration, relative to the axis of rotation 41.

While the set of stator windings 90 are schematically shown, multiple sets of stator windings 90, or multiple sets of stator windings 90 per stator core slot can be included. For instance, in one non-limiting example, at least two sets of stator windings 90 can be stacked, layered, embedded, installed, or wound about a stator core slots. Non-limiting aspects of the disclosure can also be included wherein at least a subset of the stator windings 90 can include an external layer of electrically insulating material to electrically isolate the set of stator windings 90 from another set of stator windings 90 or the main machine stator 54 or stator core.

Figure 6:
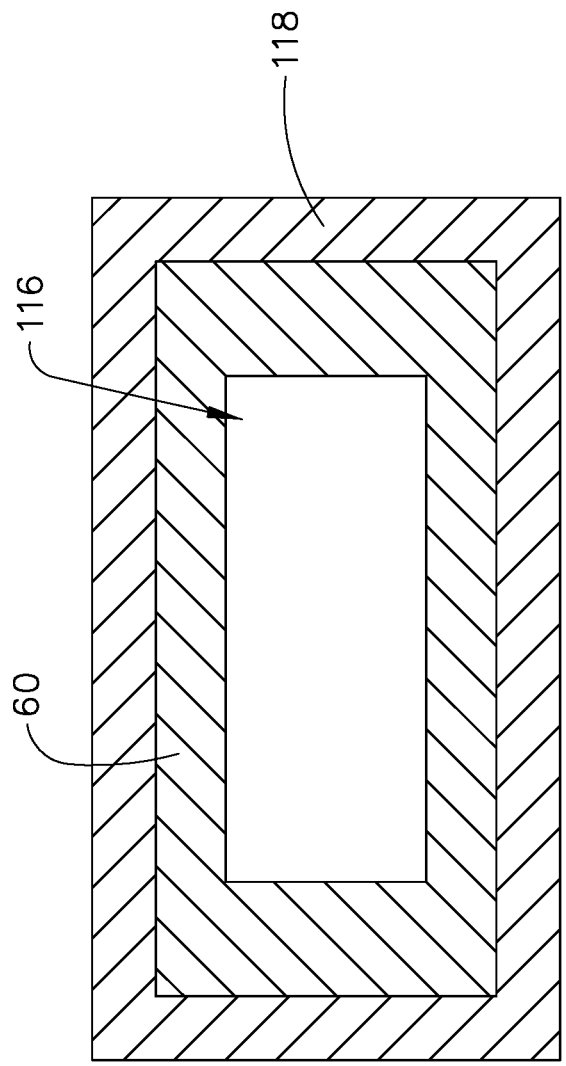
FIG. 6 is a schematic cross-sectional view of a stator winding of the generator of FIG. 3, in accordance with various aspects described herein.

FIG. 6 illustrates a simplified schematic view of an exemplary set of stator windings 90, in accordance with aspects disclosed herein. For example, the set of stator windings 90 can include a conductive winding having a fluid channel disposed throughout the length of the windings 90. In the illustrated example, the set of stator windings 90 can include a substantially square or quadrilateral cross section having a working liquid or fluid channel 116. Non-limiting aspects of the disclosure can also be included wherein the set of stator windings 90 includes a layer of electrically insulating material 118 external to, and enveloping the set of stator windings 90, to electrically isolate the set of stator windings 90 from another set of stator windings 90 and the main machine stator 54, as explained above. While a substantially square cross section is illustrated for the windings 90, any geometric shape, contour, and the like can be utilized in aspects of the disclosure (e.g. rectangular, circular, trapezoidal, triangular, etc.). Similarly, while a circular fluid channel 116 is illustrated, any geometric shape, contour, and the like can be utilized in aspects of the disclosure (e.g. rectangular, circular, trapezoidal, triangular, etc.).

While a substantially rectangular stator winding 90 cross section is illustrated, any geometric cross section can be included in aspects of the disclosure, including by not limited to circular, ovate, square, and the like. Similarly, while only a single working liquid channel 116 is illustrated in the cross-sectional view A-A, aspects of the disclosure can include a set of fluidly isolated working liquid channels 116 in a single set of stator windings 90. For example, a single ovate or rectangular cross section of the set of stator windings 90 can include parallel or dual working liquid channels 116. In one non-limiting example aspect of the set of stator windings 90, the working liquid channel 166 can be 1.0 millimeter to 2.0 millimeters in diameter.

FIG. 7 illustrates one non-limiting example aspect of the stator windings 90 and third cooling passage 104. As shown, at least a subset of the stator windings 90 includes a first end 126 of the windings 90 and an opposing second end 128 of the windings 90. The at least one subset of the stator windings 90 can pass through or proximate to at least one of the stator windings inlet housing 122 or coolant outlet housing 124. At least one of the stator windings inlet housing 122 or the coolant outlet housing 124 can also include a center bore 120 or through-hole configured to receive or match the rotatable shaft (not shown). Non-limiting aspects of the disclosure can be included wherein at least one of the stator windings inlet passage 106 or the coolant outlet passage 108 can be fluidly connected with the rotatable shaft coolant flow, described herein. In another instance of the non-limiting example shown, the first end 126 of a subset of stator windings 90 can extend through or proximate to the stator windings inlet housing 122 and the coolant outlet housing 124, and connect to an electrical terminal or power output of the generator 14. In a first example, the stator winding 90 can be fluidly connected with the stator windings inlet passage 106 by, for instance, an aperture 112 to fluidly receive the coolant (illustrated with cross section of the coolant inlet housing 122 removed to schematically show the inlet passage 106 as an arrow, and traversing toward the main machine stator). In this first example, the stator winding 90 can pass through the coolant outlet housing 124 via a through channel 110 not fluidly connected with the coolant outlet passage 108.

In another example, a different stator winding 90 segment can be fluidly connected with the stator windings coolant outlet passage 108 by, for instance, an aperture 112 to fluidly provide heated coolant from the main machine stator to the coolant outlet passage 108 (again, illustrated with cross section of the coolant outlet housing 124 removed to schematically illustrated the outlet passage 108 as an arrow). In this other example, the stator winding 90 can pass through the coolant inlet housing 122 via a through channel 110 not fluidly connected with the coolant inlet housing 122. As used herein, "heated coolant" can convey that the coolant is removing or has removed heat from an upstream component. The coolant inlet passage 106 and coolant outlet passage 108 can be further fluidly connected to a coolant circuit or coolant reservoir.

During power-generating operations, the rotation of the rotatable shaft 40 relative to the stationary generator 14 components ultimately induces generates current in the main machine stator windings 90, which is further provided to a generator power outlet, which it can be supplied to power or energize a set of electrical loads. Specifically, the rotation of the exciter rotor 62 relative to the exciter stator 64, the rotation of the PMG rotor 72 relative to the PMG stator 74, and the rotation of the main machine rotor 52 relative to the main machine stator 54 will generate heat due to heat losses, copper losses, resistive losses, winding losses, or the like, as the current traverses the respective resistive windings. In addition to the winding losses, the aforementioned components 52, 54, 62, 64, 72, 74 can generate or retain unwanted heat due to, for example, core losses due to hysteresis or eddy currents, as explained herein. For instance, as explained above, the main machine stator 54 heat can be generated or retained away from the axial ends of the stator 54.

The cooling systems 80 can enable or provide dry cavity-based cooling by way of at least the first, second, and third cooling passages 100, 102, 104, or a subset thereof, to thermally transfer heat from the heated components to the cooling liquid, such as cooling oil. In this sense, the heat generated in the respective components can be conductively transferred to the cooling liquid (i.e. "hot" liquid) of the cooling system 80, which can be forcibly pumped away from the heat-generating components.

In one non-limiting aspect of the disclosure, at least a subset of the above-described cooling system 80 can effectively remove, extract, or transfer over 39 kiloWatts of heat from a generator 14 rated at 150 kiloVolt-Amps or higher without encountering heat transfer limits. In yet another non-limiting aspect of the disclosure, the above-described configurations can be utilized in a generator 14 achieving a power density greater than 7.9 kiloWatts/kilogram.

The aforementioned aspects of the disclosure enable or provide a generator 14 having increased cooling capabilities over contemporary generators. Since aspects of the disclosure significantly increase the main machine stator 54 or set of stator windings 90 cooling capability, as well as the cooling capability of the PMG rotor 72, the exciter rotor 62, or a combination thereof, the generator 14 can be designed or operated without, or free of, additional cooling systems external to the generator 14, other than the cooling system 80 described herein. For example, aspects of the disclosure can provide for a dry cavity generator 14 wherein the system can be designed or operated without, or free of, at least an external liquid cooling jacket such that the system provides cooling greater than or equal to a predetermined level, wherein the predetermined level is based on an external liquid cooling jacket. Alternatively, or in addition to the aforementioned benefit, the above-described aspects enable or provide a generator 14 that operate at a higher power density, or generate increased power levels, without a loss in power-generation efficiency due to undesirable heating.

Operating the cooling system 80 to enable or provide increased cooling capabilities, and thus higher power generation operating capability, further enables or provides for a generator 14 having a higher overall power density compared with a conventional electrical machine wherein the exciter and PMG are arranged in series or sequentially along the axial direction of the rotational axis. When combined (the coplanar exciter 60 and PMG 70, along with the cooling systems 80 described herein), the generator 14 can have a power density equal to or greater than double that of a conventional electric machine. In one non-limiting example the generator 14 described herein can generate at least 1 megawatt of electrical power utilizing the aspects described herein.

Yet another advantage of the above described aspects can include increased efficiency with regards to the cooling system. For instance, wet cavity type of cooling is an effective cooling strategy for generators, but is less efficient compared with dry cavity cooling described herein. In another non-limiting example, inefficiencies in wet cavity cooling due to the oil interactions with moving components in the cavity cause significant dynamic losses for the generator. Aspects of the disclosure can provide a construction of dry cavity generators that includes high efficiency cooling and high power density.

In one non-limiting example, a generator employing aspects of the disclosure can include a power density of 7.9 kiloWatt/kilogram, or greater than 7.0 kiloWatt/kilogram. Conventional generators wherein the exciter and PMG are sequentially arranged (i.e. not coplanar) can include a power density of 3.3 kiloWatt/kilogram.

Aspects of the generator 14 described herein can also be included in a method of operating the generator 14. For example, the method of operating the generator 14 can include rotating the rotatable shaft 40 about the rotational axis 41, with the shaft 40 carrying the arm 24 extending radially outward from the shaft 40. The arm 24 can be configured to rotatably carry at least one of the exciter rotor 62, the permanent magnet generator rotor 72, or both rotors 62, 72. At least one of the exciter rotor 62 or the permanent magnet generator rotor 72 is mounted to the arm 24, and are substantially coplanar at a plane 22 orthogonal to the rotational axis 41. In one non-limiting aspect of the disclosure, method can optionally include supplying liquid coolant to a contained cooling passage, such as the first cooling passage 100 of the arm 24 to extract heat from the arm 24. In another non-limiting aspect of the disclosure, the method can include supplying liquid coolant to a contained cooling passage extending through at least one set of stator windings 90, such as the third cooling passage 104, to extract heat from the at least one set of stator windings 90.

The method described is for example purposes only and is not meant to limit the method in any way as it is understood that the portions of the method can proceed in a different logical order, additional or intervening portions can be included, or described portions of the method can be divided into multiple portions, or described portions of the method can be omitted without detracting from the described method.

Although the above aspects have been described in terms of a generator for a gas turbine engine, the above-described aspects can be used in any electric machine to significantly increase the stator or rotor power-generating or cooling capability. The above-described aspects of the disclosure can be well-suited for certain generator applications, such as a two-pole generator (e.g. two stator poles and two rotor poles) positioned proximate to the turbine engine, and thus creating a high temperature and space or volume-limited environment for generator operation.

Many other possible aspects and configurations in addition to that shown in the above figures are contemplated by the present disclosure. For example, the set of stator windings can include one or more sequentially connected set of stator windings, wherein the set of stator windings are electrically connected between one another. In another aspect of the disclosure, it will be understood that the hollow portion of the set of stator windings, and coolant flow therethrough can also be applied to winding portions of the exciter 60, the PMG 70, the main machine 50, or a combination thereof. Additionally, the design and placement of the various components can be rearranged such that a number of different in-line configurations could be realized. For instance, aspects of the disclosure can be included wherein the PMG 70 is located radially outward from the exciter 60. In yet another non-limiting aspect, at least one of the main machine rotor, main machine stator, housing, or rotatable shaft can be manufactured by way of additive manufacturing, or three-dimensional printing. Additive manufacturing can further be utilized for at least one of the cooling passages.

The aspects described above provider for a variety of benefits including that they have higher efficiency, high reliability, less maintenance, all-attitude operation, and lower weight. By attaining increased cooling capabilities for the dry cavity electric machine free of cooling systems external to the machine other than those described herein, the electric machine can eliminate the additional the costs, complexity, weight, and size requirements of the additional cooling systems otherwise needed. The resulting electric machine is lighter, smaller, and has less complexity than conventional dry cavity machines. The resulting electric machine also has a higher power density due to at least one of a reduced axial length of the rotatable shaft, increased power generation due to improved cooling capabilities, or a combination thereof. Such a weight reduction, improved cooling capabilities, or a higher power density is important in a turbine engine environment and provides a competitive advantage during flight. The reduced complexity can also correspond to reduced maintenance over time, also providing lower operating costs.

To the extent not already described, the different features and structures of the various aspects can be used in combination with others as desired. That one feature cannot be illustrated in some of the aspects is not meant to be construed that it cannot be, but is done for brevity of description. Thus, the various features of the different aspects can be mixed and matched as desired to form new aspects, whether or not the new aspects are expressly described.

This written description uses examples to disclose the invention, including the best mode, and also to enable any person skilled in the art to practice the invention, including making and using any devices or systems and performing any incorporated methods. The patentable scope of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An electric machine assembly comprising:
a main machine stator core having at least one stator post;
a set of stator windings wound about the at least one stator post and having a first end and an opposing second end, the stator windings defining a fluid channel disposed through the stator windings configured to carry a flow of coolant;
a coolant inlet housing defining an inlet passage disposed at an axial end of the electric machine assembly fluidly connected with the fluid channel of the first end of the set of stator windings; and
a coolant outlet housing defining an outlet passage disposed at the axial end of the electric machine assembly, proximate to the coolant inlet housing, and fluidly connected with the fluid channel of the second end of the stator windings;
wherein the coolant inlet passage, the fluid channel of the stator windings, and the coolant outlet passage define a coolant circuit configured to receive a supply of coolant to remove heat generated in the set of stator windings.

2. The electric machine assembly of claim 1 wherein the first end and second end of the stator windings extend axially beyond opposing ends of the longitudinal length of the main machine stator core.

3. The electric machine assembly of claim 2 wherein the coolant inlet housing and the coolant outlet housing are disposed axially beyond the longitudinal length of the main machine stator core.

4. The electric machine assembly of claim 3 wherein the coolant inlet housing defines a first through channel sized and disposed to receive the second end of the stator windings through the first channel.

5. The electric machine assembly of claim 4 wherein the coolant outlet housing defines a second through channel sized and disposed to receive the first end of the stator windings through the first through channel.

6. The electric machine assembly of claim 3 wherein the second end of the stator windings connect with an electrical terminal beyond the first through channel.

7. The electric machine assembly of claim 3 wherein the coolant inlet housing and the coolant outlet housing are axially spaced.

8. The electric machine assembly of claim 1 wherein at least one of the coolant inlet housing or the coolant outlet housing is in the form of a pancake coolant housing.

9. The electric machine assembly of claim 8 wherein the coolant inlet housing and the coolant outlet housing are in the form of pancake coolant housings.

10. The electric machine assembly of claim 1 wherein at least one of the coolant inlet housing or the coolant outlet housing is in the form of a ring coolant housing.

11. The electric machine assembly of claim 1 wherein the coolant is at least one of oil or air.

12. The electric machine assembly of claim 1 wherein the electrical machine assembly is a dry cavity electric machine assembly.

13. The electric machine assembly of claim 1 wherein the set of stator windings have a substantially quadrilateral cross section.

14. The electric machine assembly of claim 1, further including an electrically isolating material externally enveloping the set of stator windings.

15. The electric machine assembly of claim 1 wherein the set of stator windings defines at least two fluid channels per winding.

16. The electric machine assembly of claim 1 wherein a diameter of the fluid channel is between 1.0 and 2.0 millimeters.

17. The electric machine assembly of claim 1 further comprising a coolant reservoir fluidly connected with the inlet passage of the coolant inlet housing.

18. The electric machine assembly of claim 17 wherein the inlet passage of the coolant inlet housing is fluidly connected with the coolant flow of the rotatable shaft.

19. The electric machine assembly of claim 1 further comprising:
- a housing;
- a shaft configured to operably couple with a source of rotational force and rotate about a rotational axis; and
- an exciter rotor and a permanent magnet generator rotor carried by the shaft;
- wherein the exciter rotor and the permanent magnet generator rotor are substantially coplanar at a plane orthogonal to the rotational axis.

20. The electric machine assembly of claim 19 wherein the exciter rotor and the permanent magnet generator rotor are coplanar at a plane orthogonal to the rotational axis.

* * * * *